June 6, 1967          G. W. LAMBROS          3,323,760
FLUID-DYNAMIC BALANCING MECHANISM FOR HINGED STRUCTURES
Filed Aug. 30, 1965
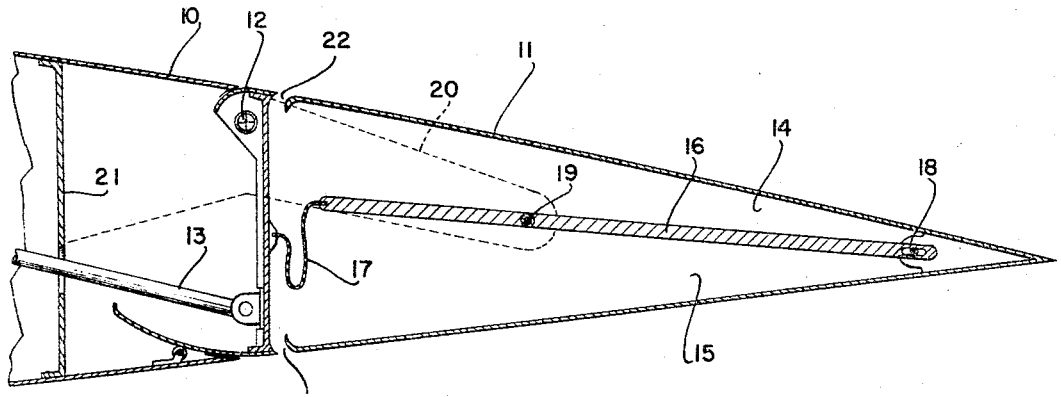
FIG_1
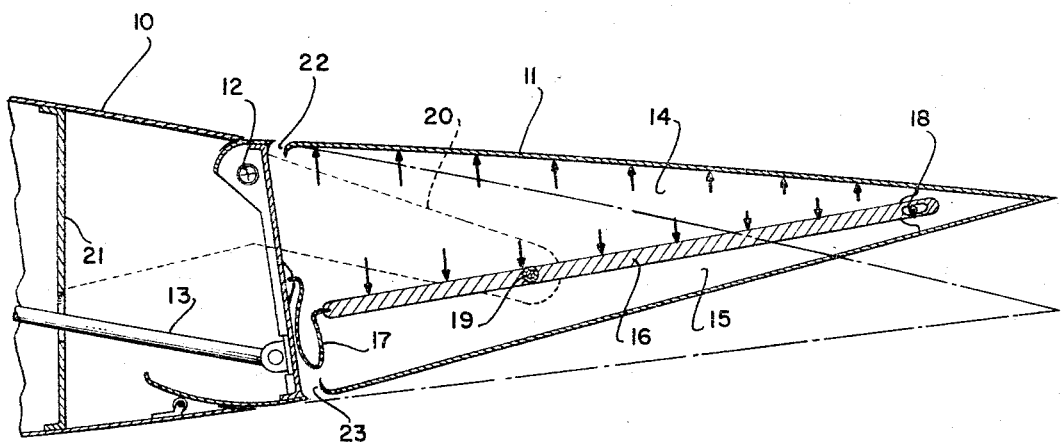
FIG_2
*INVENTOR.*
GEORGE W. LAMBROS
BY
Agent

United States Patent Office 3,323,760
Patented June 6, 1967

3,323,760
FLUID-DYNAMIC BALANCING MECHANISM FOR HINGED STRUCTURES
George W. Lambros, Stratford, Conn., assignor, by mesne assignments, to Lockheed Aircraft Corporation, Burbank, Calif.
Filed Aug. 30, 1965, Ser. No. 483,560
2 Claims. (Cl. 244—90)

This invention relates to balancing mechanisms for hinged structures and more particularly to such a mechanism that is fluid dynamic being capable of providing static balance of a structure about its hinge axis to thereby reduce the hinge moment or force required to deflect the structure.

While the present invention has general application and utility wherever fluid dynamic balancing of a hinged structure is required, it offers special advantages in the case of external control surfaces employed on vehicles such as air and water craft. These external control surfaces are disposed in the fluid medium in which the craft operates and the deflection thereof serves to control the direction of movement of the craft through that medium.

The broad idea of balancing these control surfaces is not new, many schemes having heretofore been proposed for this purpose. For example, it is well known that the control surfaces of high speed and/or large aircraft tend to "freeze" in the neutral position due to the high pressures produced by the airstream passing over the surfaces. Any deflection of a simple hinged control surface from its neutral position is resisted by the pressure of the airstream acting on the outer area of the surface which can and does reach a magnitude which human strength alone cannot attain. Thus, power boosters and other supplemental devices have been resorted to in order to permit the pilot to maneuver the aircraft.

The conventional internal type of control surface balance evolved because of its advantages over other concepts, notably its small weight penalty, its lack of adverse aerodynamic effects, its totally automatic operation, and its reliability. This prior balance concept was realized through the use of a chamber immediately adjacent the movable control surface and a rigid board fixed to and extending from the movable control surface to be disposed within this chamber. The chamber is vented to the airstream in such a manner that a pressure differential is created across the board principally by control surface deflection and to a lesser degree by changes in the angle of attack of the aircraft.

This prior art design overlooks several important factors and to that extent is highly objectionable in many cases. Internal space within the aircraft is at a premium and the balance chamber constitutes a substantial loss of volume. The arc or sweep of the balance board in producing the desired hinge moments usually necessitates extending the profile of the movable control surface beyond its normal minimum radius at and along its hinge line. In wings and other relatively thin components of the aircraft associated with the movable control surfaces, limitations are thereby placed on the transverse dimension of the balance board and/or restrictions of surface deflections result. Structural design of the wing is compromised due to the requirement for clearance for the balance board. Necessary structural members often cause the balance board and seals to be complicated by numerous cutouts.

The present invention proposes to overcome these and other shortcomings of the earlier control surface balancing schemes by locating the balance board within the movable control surface itself. This results in a greater degree of hinge moment reduction than is otherwise practicable. Due to this greater reduction, boostered and powered control systems may either be eliminated or substantially reduced in size and weight. The normally unused internal control surface volume can thereby be employed to advantage allowing for a balance board of greater effective area than heretofore practical and at the same time making available for other usage the internal aircraft volume that was previously required for the balance chamber.

Another advantage of the instant invention over prior art designs is that it permits optimum location of the pressure sensing vents both chordwise and spanwise. Since the peak pressure differential across a deflected control surface occurs very close to the chordwise station of its hinge line and near its mid-span, the optimum location of the vents is readily permitted by the arrangement herein proposed. The restriction of the vents to the mid-span portion of the control surface increases the effective chamber pressures and is possible due to the salient features of the present invention.

With the above and other objects in view as will be apparent, this invention consists in the combination, construction and arrangement of parts all as hereinafter more fully described, claimed and illustrated in the accompanying drawings wherein:

FIGURE 1 is a sectional view of a movable control surface for aircraft and a fragment of its adjacent supporting structure to show an aerodynamic balancing mechanism for the control surface illustrative of an application of the present invention, the control surface being disposed in the neutral position; and FIGURE 2 is a similar view with the control surface disposed in a deflected position, the neutral position being shown in phantom lines.

With more particular reference to the drawings, 10 designates a fragment of an aircraft or a component part thereof such as a fixed wing or the like to which a movable control surface 11 is hinged as at 12 and forms the aft end thereof. A conventional actuator 13 connected to the forward end of the control surface 11 at one of its ends and to stationary structure (not shown) of the component 10 serves to rotate the surface 11 about its hinge 12 to accomplish various flight directions and maneuvers of the aircraft. This actuator may be power driven or manual as desired through conventional means.

The interior of the control surface 11 is divided into two discrete sealed chambers 14 and 15 by means of a partition or balance board 16 fabricated of a rigid material and a flexible seal 17. The seal 17 is connected to the board 16 at and along the entire perimeter thereof and also to the adjacent walls defining the movable control surface 11. The balance board 16 is pivotally connected at its rear edge to a slidable hinge 18 adjacent the trailing edge of the control surface 11 and medially as at 19 to a fixed support 20 carried by and projecting from the component 10. The support 20 is secured to a rib or bulkhead 21 internally of the component 10 and extends therefrom into the movable control surface 11 through a slot therein. Thus mounted, the balance board 16 is substantially coextensive with the fore and aft dimension of the interior of the movable control surface 11.

Each of the chambers 14 and 15 is vented through suitable openings 22 and 23 to the exterior of the surface control 11 and during flight, to the airstream. These openings or vents 22 and 23 are located adjacent the leading edge of the control surface 11 to be substantially at the chordwise station of the hinge 12. Preferably, these vents 22 and 23 are defined by generally arcuate walls to direct an external flow of air from the interior thereof in an aft direction along the exterior surface of the control surface 11 so as to reduce drag and prevent separation of the air flow.

In view of the foregoing construction and arrangement, as the control surface 11 is deflected for example upward by the actuator 13, higher pressure will develop in the region of the upper vent 22 and a lower pressure will develop in the region of the lower vent 23. These pressure are transmitted into the upper and lower chambers 14 and 15, respectively. A load (indicated by the arrows, FIGURE 2) is thereby developed on the balance board as well as on the inner face of the control surface 11 defining the chamber 14 causing a moment about the hinge 12 which is in opposition to the external load on the deflected control surface 11. A complementary condition exists in chamber 15 due to the lower pressures at vent 23. The loads acting in chambers 14 and 15 are additive and sum up to provide a balancing moment which serves to cancel out air loads that would otherwise be acting upon the control surface 11 tending to "freeze" it in the neutral position.

It is to be understood that the above disclosure is directed to a preferred embodiment of the invention to facilitate a clear understanding thereof. This disclosure admits to various changes and modifications, as will appear to those skilled in the art, without departing from the true spirit and scope of the invention which is to be limited solely by the appended claims.

What is claimed is:

1. A fluid-dynamic balancing mechanism for a hinged structure connected to stationary structure comprising a pressure responsive member mounted within the hinged structure for limited linear movement relative thereto and pivotally connected to the stationary structure medially of its fore and aft dimension with respect to said stationary structure, said member including a rigid board and a sliding hinge between the edge of said board remote from said stationary structure and said hinged structure to effect the linear movement aforesaid, a pair of discrete sealed chambers within said hinged structure separated by said member, and at least one vent opening piercing said hinged structure in communication with each of said chambers.

2. A fluid-dynamic balancing mechanism for a hinged structure connected to stationary structure comprising a pressure responsive member mounted within the hinged structure for limited linear movement relative thereto and pivotally connected to the stationary structure medially of its fore and aft dimension with respect to said stationary structure, the pivotal connection of said member to said stationary structure aforesaid being proximate the forward end of said member and said limited linear movement being effected by a pin carried by said hinged structure and operable in a slot in the aft end of said member, a pair of discrete sealed chambers within said hinged structure separated by said member, and at least one vent opening piercing said hinged structure in communication with each of said chambers.

References Cited
UNITED STATES PATENTS

| 2,211,870 | 8/1940 | Wagner et al. | 244—90 |
| 2,506,939 | 5/1950 | Plath | 244—90 |

FOREIGN PATENTS

| 718,435 | 11/1954 | Great Britain. |

DUANE A. REGER, *Primary Examiner.*

A. H. FARRELL, *Assistant Examiner.*